M. J. NAPIER.
RESILIENT TIRE.
APPLICATION FILED JUNE 22, 1914.

1,201,859.

Patented Oct. 17, 1916.

WITNESSES:
J. H. Perrault.
L. M. Spencer.

INVENTOR
Melvin J. Napier.
BY
Edward N. Pagelsen.
ATTORNEY

UNITED STATES PATENT OFFICE.

MELVIN JAMES NAPIER, OF DETROIT, MICHIGAN.

RESILIENT TIRE.

1,201,859.  Specification of Letters Patent.  Patented Oct. 17, 1916.

Application filed June 22, 1914. Serial No. 846,424.

*To all whom it may concern:*

Be it known that I, MELVIN J. NAPIER, a citizen of the United States, and a resident of Detroit, in the county of Wayne and State of Michigan, have invented a new and Improved Resilient Tire, of which the following is a specification.

This invention relates to a resilient tire for vehicle wheels and its object is to provide a construction which may be easily assembled, which possesses great flexibility, and which will withstand severe usage for a relatively long time.

This invention consists in the details of construction shown and described, and particularly pointed out in the claims.

Figure 1:
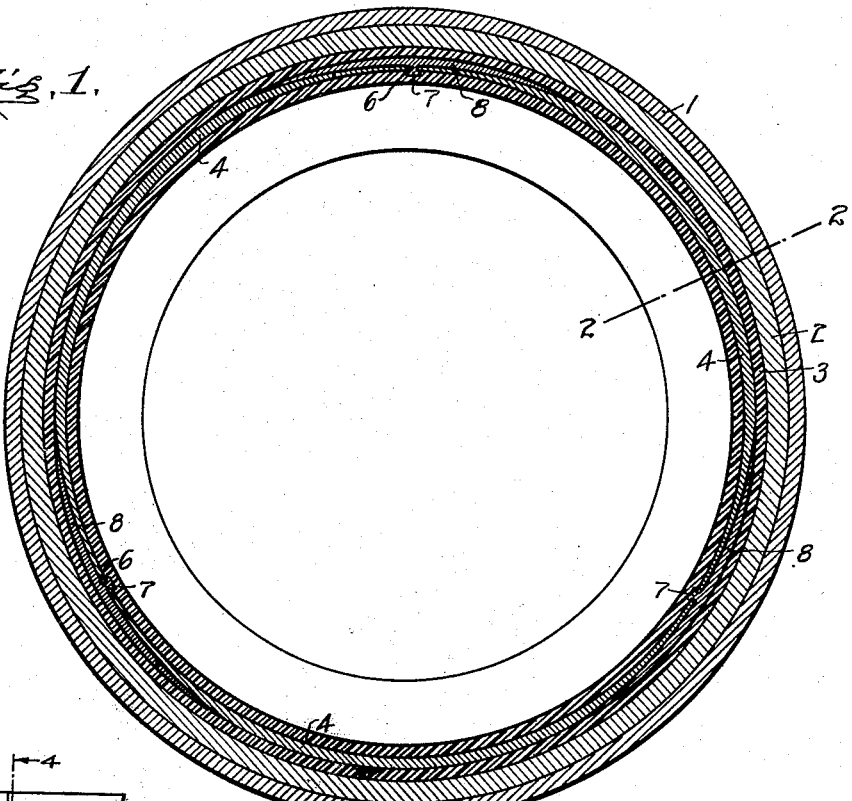
Figure 3:
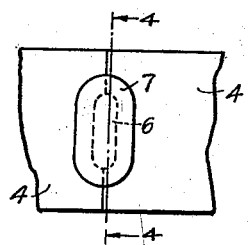
Figure 2:
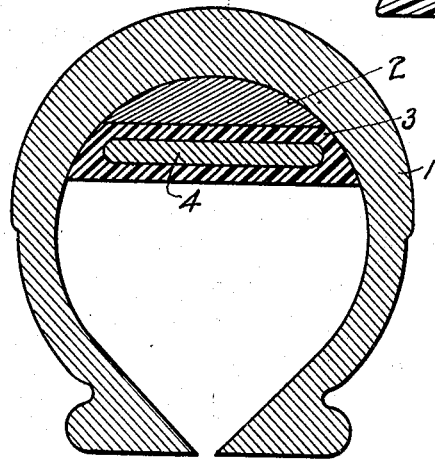
Figure 4:
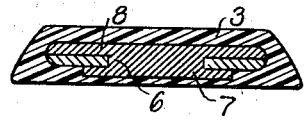

In the accompanying drawing, Figure 1 is a longitudinal section through a tire in which my invention is embodied. Fig. 2 is a section on the line 2—2 of Fig. 1. Fig. 3 is a plan view showing the joint between adjacent sections of the spring. Fig. 4 is a section on the line 4—4 of Fig. 3.

Similar reference characters refer to like parts throughout the several views.

In the embodiment shown, the casing 1, of any desired form, incloses and protects a soft-rubber pad or cushion 2 of segmental cross-section, the inner face of which is vulcanized to the outer face of a vulcanized hard-rubber band 3 that extends throughout the circumference of the rim. Embedded in the band 3 are the arc-shaped sections 4 of a circumferential metal spring, preferably bronze or brass, the ends of which are tapered for a considerable angular distance and notched to receive the shank 6 of a connector by which they are joined. The connector comprises a relatively small inner head 7 of any desired form, and a leaf portion 8, the ends of which are tapered to correspond to the taper of the ends of the spring sections, and extend through a number of degrees of curvature of the rim. The leaf portions are also preferably made of spring brass or bronze, and besides acting, together with the head 7, to join the ends of adjacent spring sections 4, act also to form parts of the spring ring itself. Because of the relatively long taper of each of the parts, the stress is gradually transferred from a particular spring section to the adjacent end of a connector, and from the connector to the next adjacent spring section 4 on the opposite side of the head 7. While I have shown the head 7 formed integral with the leaf portion 8, it is obvious that it may in some cases be made in a separate piece and secured to the leaf in any desired manner. It will be understood that the spring band is of sufficient resiliency to withstand the stresses to which the rim is subjected.

In the development of this tire, I at one time used a circumferential spring consisting of a single member, but after using the rim so constituted for a few days it crystallized in certain localities which seemed to correspond to nodes of very short vibrations set up in the spring. I find that when a sectional spring is used, these short vibrations are largely avoided; and when the sectional spring is embedded in hard rubber in the manner shown, crystallization is practically avoided altogether. The hard rubber, while flexible enough to allow the relatively long vibrations incident to the use of the rim, effectually checks or dampens, or perhaps does away entirely with the short vibrations, with the result that this resilient band is found, at the end of extended tests, to be in substantially the same condition as at the beginning.

While I prefer to make the spring in three sections it may, in certain instances, be made of a larger or smaller number, or may be made of a single band. And in lieu of the hard rubber inclosure, some other hard flexible substance, such as canvas vulcanized or cemented directly to the metal of the spring, may be used, but I prefer the hard rubber because of its efficiency in overcoming the vibrations. I do not, therefore, wish to be limited otherwise than as indicated in the subjoined claims.

I claim:—

1. A resilient tire comprising a casing, a resilient metal band within the casing and extending throughout the circumference thereof, said band being of sufficient strength to resist the stresses to which the tire is subjected, and a hard rubber inclosure in which the band is embedded and to which it is secured by vulcanization.

2. A resilient tire comprising a casing, a resilient metal band within the casing and extending throughout the circumference thereof, said band being of sufficient strength to resist the stresses to which the tire is subjected, a hard rubber inclosure in which the band is embedded and to which it is secured by vulcanization, and a soft rubber pad extending circumferentially of the tire between the hard rubber inclosure and the casing and vulcanized to the hard rubber inclosure.

3. A resilient tire comprising a casing, a resilient metal band within the casing and extending throughout the circumference thereof, said band being of sufficient strength to resist the stresses to which the tire is subjected, and consisting of a series of leaf springs arranged end to end, and a hard flexible inclosure in which the springs are embedded and to which they are secured throughout the area of contact.

4. A resilient tire comprising a casing, a resilient metal band within the casing and extending throughout the circumference thereof, said band being of sufficient strength to resist the stresses to which the tire is subjected, and consisting of a series of leaf springs arranged end to end, said ends being tapering, and a series of connecting members for the leaf springs, said connecting members having tapering ends corresponding to the tapering ends of the leaf springs, the ends of the connecting members being resilient, and a hard flexible inclosure in which the metal band is embedded.

5. A resilient tire comprising a casing, a resilient metal band within the casing and extending throughout the circumference thereof, said band being of sufficient strength to resist the stresses to which the tire is subjected, and consisting of a series of leaf springs arranged end to end, said ends being tapering, and a series of connecting members for the leaf springs, said connecting members having tapering ends corresponding to the tapering ends of the leaf springs, the ends of the connecting members being resilient, and a hard rubber inclosure in which the metal band is embedded and to which it is secured by vulcanization.

6. A resilient tire comprising a casing, a resilient metal band within the casing and extending throughout the circumference thereof, said band being of sufficient strength to resist the stresses to which the tire is subjected, and consisting of a series of leaf springs arranged end to end, said ends being tapering, and a series of connecting members for the leaf springs, said connecting members having tapering ends corresponding to the tapering ends of the leaf springs, the ends of the connecting members being resilient, a hard flexible inclosure in which the metal band is embedded, and a soft flexible pad extending circumferentially of the tire between the hard flexible inclosure and the casing.

7. A resilient tire comprising a casing, a resilient metal band within the casing and extending throughout the circumference thereof, said band being of sufficient strength to resist the stresses to which the tire is subjected, and consisting of a series of leaf springs arranged end to end, said ends being tapering, and a series of connecting members for the leaf springs, said connecting members having tapering ends corresponding to the tapering ends of the leaf springs, the ends of the connecting members being resilient, a hard rubber inclosure in which the metal band is embedded and to which it is secured by vulcanization, and a soft flexible pad extending circumferentially of the tire between the hard flexible inclosure and the casing.

8. A resilient tire comprising a casing, a resilient metal band within the casing and extending throughout the circumference thereof, said band being of sufficient strength to resist the stresses to which the tire is subjected, and consisting of a series of leaf springs arranged end to end, said ends being tapering, and a series of connecting members for the leaf springs, said connecting members having tapering ends corresponding to the tapering ends of the leaf springs, the ends of the connecting members being resilient, a hard rubber inclosure in which the metal band is embedded and to which it is secured by vulcanization, and a soft rubber pad extending circumferentially of the tire between the hard rubber inclosure and the casing and vulcanized to the hard rubber inclosure.

9. A resilient tire comprising a casing, a resilient metal band within the casing and extending throughout the circumference thereof, said band being of sufficient strength to resist the stresses to which the tire is subjected, and consisting of a series of leaf springs arranged end to end, said ends being tapering, and a series of connecting members for the leaf springs, said connecting members having tapering ends corresponding to and located outside of the tapering ends of the leaf springs, the ends of the connecting members being resilient, means for securing the connecting members in angular position in respect to the leaf springs, and a hard rubber inclosure in which the metal band is embedded and to which it is secured by vulcanization.

10. A resilient tire comprising a casing, a resilient metal band within the casing and extending throughout the circumference thereof, and consisting of a series of leaf springs arranged end to end, and a hard flexible inclosure in which the springs are embedded and to which they are secured throughout the area of contact.

In testimony whereof I have signed this specification in the presence of two subscribing witnesses.

MELVIN JAMES NAPIER.

Witnesses:
EDWARD N. PAGELSEN,
HUGO W. KREINBRING.